US011986946B2

(12) United States Patent
Zhang et al.

(10) Patent No.: US 11,986,946 B2
(45) Date of Patent: May 21, 2024

(54) CONNECTION STRUCTURE OF MODULE, STORAGE BOX AND STORAGE BOX ASSEMBLY

(71) Applicant: Meridian International Co., Ltd, Shanghai (CN)

(72) Inventors: Hongquan Zhang, Shanghai (CN); Qiang Wang, Shanghai (CN); Shujun Cai, Shanghai (CN)

(73) Assignee: Meridian International Co., Ltd., Shanghai (CN)

( * ) Notice: Subject to any disclaimer, the term of this patent is extended or adjusted under 35 U.S.C. 154(b) by 0 days.

(21) Appl. No.: 18/518,200

(22) Filed: Nov. 22, 2023

(65) Prior Publication Data

US 2024/0083014 A1 Mar. 14, 2024

Related U.S. Application Data

(63) Continuation of application No. 18/176,907, filed on Mar. 1, 2023.

(30) Foreign Application Priority Data

Mar. 4, 2022 (CN) ......................... 202210212862.5
Jan. 13, 2023 (CN) ......................... 202320135456.3

(51) Int. Cl.
*B25H 3/02* (2006.01)
*B65D 21/02* (2006.01)

(52) U.S. Cl.
CPC ......... *B25H 3/026* (2013.01); *B65D 21/0228* (2013.01); *B65D 2255/00* (2013.01)

(58) Field of Classification Search
CPC ............ B65D 21/0223; B65D 21/0228; B65D 21/0219; B65D 21/0217; B65D 21/0209; B65D 21/0213; B65D 21/0224; B65D 21/0212; B65D 2543/00027; B65D 21/0215; B65D 21/02; B65D 21/023; B25H 3/023; B25H 3/021; B25H 3/02; B25H 3/026; B25H 3/028
USPC ....... 206/499, 501, 503, 508, 509, 510, 511, 206/512, 1.5
See application file for complete search history.

(56) References Cited

U.S. PATENT DOCUMENTS 3,648,849 A 3/1972 Harris
3,980,185 A * 9/1976 Cain .................... B65D 88/022 206/509
4,619,363 A 10/1986 Wolfseder
(Continued)

FOREIGN PATENT DOCUMENTS

CN 203427004 U 2/2014
CN 206841966 U 1/2018
(Continued)

OTHER PUBLICATIONS

Cai, Shujun—U.S. Appl. No. 17/010,975, filed Sep. 3, 2020.
(Continued)

*Primary Examiner* — Steven A. Reynolds
*Assistant Examiner* — Prince Pal
(74) *Attorney, Agent, or Firm* — SHUTTLEWORTH & INGERSOLL, PLC; Jason R. Sytsma

(57) ABSTRACT

A mating part in a locking path of a stop part so that the locking part is not automatically lockable and a first connection part is in a state of remaining unlocked from a second connection part.

16 Claims, 16 Drawing Sheets

(56) References Cited

U.S. PATENT DOCUMENTS 4,736,861 A * 4/1988 Basili ................... G11B 23/027
5,011,013 A 4/1991 Meisner et al.
5,518,139 A * 5/1996 Trower .................. A45C 11/20 206/379
6,082,539 A * 7/2000 Lee ....................... B25H 3/021 206/821
6,193,062 B1 2/2001 Rysgaard et al.
6,371,320 B2 4/2002 Sogol
6,761,366 B1 7/2004 Klemmensen et al.
6,889,838 B2 5/2005 Meier et al.
7,780,026 B1 * 8/2010 Zuckerman ........ B65D 21/0223 206/508
D630,435 S 1/2011 Brunner
8,567,796 B2 10/2013 Bar-Erez et al.
8,602,217 B2 * 12/2013 Sosnovsky ......... B65D 21/0228 220/756
8,851,287 B2 * 10/2014 Becklin .............. B65D 21/0224 108/55.3
8,875,888 B2 * 11/2014 Koenig .............. B65D 21/0223 206/508
8,936,258 B2 1/2015 Bar-Erez et al.
9,132,543 B2 9/2015 Bar-Erez et al.
9,277,796 B1 3/2016 Elam
9,393,684 B2 7/2016 Christopher et al.
9,550,605 B1 * 1/2017 Summers ................ B62B 3/004
9,566,990 B2 2/2017 Bar-Erez et al.
9,643,629 B2 5/2017 Bar-Erez et al.
9,725,209 B1 * 8/2017 Ben-Gigi ............... B25H 3/021
10,093,445 B1 * 10/2018 Hertz ................. B65D 21/0223
10,106,180 B2 10/2018 Bar-Erez et al.
10,434,638 B1 10/2019 Tsai
10,583,962 B2 3/2020 Brunner et al.
10,603,783 B2 * 3/2020 Brocket ................. B65D 21/02
10,703,534 B2 7/2020 Brunner et al.
10,793,172 B2 10/2020 Brunner
10,981,696 B2 4/2021 Brunner et al.
11,008,136 B2 5/2021 Brunner et al.
11,027,883 B1 6/2021 Brunner et al.
11,059,631 B1 7/2021 Brunner et al.
11,066,089 B2 7/2021 Brunner
11,155,382 B1 * 10/2021 Cai .................... B65D 21/0223
11,192,689 B2 12/2021 Cai
11,192,690 B1 12/2021 Brunner et al.
11,459,008 B2 10/2022 Brunner et al.
11,642,777 B2 * 5/2023 Baruch .................. B25H 3/022 403/322.4
11,643,252 B2 * 5/2023 Barabeisch ........ B65D 25/2858 206/508
11,858,687 B2 * 1/2024 Barabeisch .............. B25H 3/02
2002/0000440 A1 * 1/2002 Sagol ....................... B25H 3/00 220/23.6
2003/0062365 A1 4/2003 Krueger
2003/0094392 A1 * 5/2003 Meier ................ B65D 21/0213 206/503
2004/0144670 A1 * 7/2004 Riley ..................... A61B 50/30 206/439
2005/0150892 A1 * 7/2005 Miller .................... B65D 19/18 220/324
2007/0012694 A1 * 1/2007 Duvigneau ............ B25H 3/026 220/4.27
2007/0194543 A1 * 8/2007 Duvigneau .............. A45C 5/14 280/47.26
2008/0121547 A1 5/2008 Dur et al.
2009/0178946 A1 * 7/2009 Patstone ............ B65D 21/0223 206/509
2010/0219193 A1 * 9/2010 Becklin .............. B65D 21/0224 220/630
2011/0049824 A1 3/2011 Bar-Erez et al.
2011/0139666 A1 * 6/2011 Sosnovsky ............. B25H 3/021 206/508
2011/0139777 A1 6/2011 Sosnovsky et al.
2011/0155613 A1 6/2011 Koenig et al.
2011/0168599 A1 7/2011 Koenig et al.
2012/0024739 A1 * 2/2012 Fjelland .................. F16B 45/02 403/321
2012/0312812 A1 * 12/2012 Sosnovsky ............. B65D 45/22 220/23.83
2012/0326406 A1 12/2012 Lifshitz et al.
2015/0274362 A1 * 10/2015 Christopher ....... B65D 21/0219 206/506
2016/0130034 A1 * 5/2016 Kuhls .................. B65D 21/023 206/510
2016/0144500 A1 5/2016 Chen
2016/0236592 A1 8/2016 Peniche et al.
2017/0121056 A1 * 5/2017 Wang ................. B65D 21/0228
2017/0151972 A1 6/2017 Bar-Erez et al.
2018/0220758 A1 8/2018 Burchia
2019/0002004 A1 1/2019 Brunner
2019/0039781 A1 * 2/2019 Kögel ................ B65D 21/0212
2019/0168376 A1 * 6/2019 Brocket ................. B25H 3/028
2019/0291922 A1 * 9/2019 Gonitianer ......... B65D 21/0228
2019/0308772 A1 10/2019 Gonitianer
2019/0315515 A1 10/2019 Gonitianer
2020/0025229 A1 1/2020 Baruch
2020/0346819 A1 11/2020 Kogel
2021/0221561 A1 * 7/2021 Davidian ................. B25H 3/02
2022/0033140 A1 * 2/2022 Barabeisch .......... B65D 21/023
2022/0041336 A1 * 2/2022 Barabeisch ........ B65D 21/0223

FOREIGN PATENT DOCUMENTS

DE 202013003741 U1 4/2013
DE 202015106823 U1 3/2017
DE 102015013053 A1 4/2017
EP 0555533 A1 8/1993
EP 1059240 A1 12/2000
EP 1238602 A3 9/2002
EP 1516703 A1 3/2005
EP 2402259 A1 1/2012
JP 2005162223 A 6/2005
WO 2011135559 A1 11/2011
WO 2019105598 A1 6/2019

OTHER PUBLICATIONS

Cai, Shujun—U.S. Appl. No. 17/956,459, filed Sep. 29, 2022.
European Search Report dated Mar. 9, 2021 from related European Patent Application No. 20194860.1.
Australian Examination Report dated Feb. 19, 2022 from related Australian Patent Application No. 20220202609.
Dewalt ToughSystems 2.0 Toolbox, DWST08165, https://www.dewalt.com/product/dwst08165/toughsystemr-20-toolbox?tid=576956, Screen print of webpage printed Sep. 13, 2022 Original date unknown but prior to U.S. filing date.
Dewalt ToughSystem 2.0 Full-Size Organizer, DWST08040, https://www.dewalt.com/product/dwst08040/toughsystemr-20-full-size-organizer, Screen print of webpage printed Sep. 13, 2022 Original date unknown but prior to U.S. filing date.
Boschtools.com “L-boxx” products, Model #: L-boxx-1, L-boxx-2, L-boxx-3, L-boxx-4, http://www.boschtools.com/Products/Tools/Pages/Item Results.aspx?catid=1 611, Date unknown but prior to U.S. filing date.
festoolproducts.com “T-Loc” products, Model #: SYS 1, SYS 2, SYS 3, SYS 4, SYS 5, http://www.festoolproducts.com/Systainer-Storage-System-s/75.htm, Date unknown but prior to U.S. filing date.
dewalt.com, “TSTAK” products, Model #: DWST08201, DWST08203, DWST08204, http://www.dewait com/tool-categories/hand-tools-storage-and-work-support-mobile-work-shop-st orage.aspx, Date unknown but prior to U.S. filing date.
dewalt.com, “Tough System” products, Model#: DWST17804, DWST17803, DWST17807, http://www.dewait com/tool-categories/hand-tools-storage-and-work-support-tstak.aspx, Date unknown but prior to U.S. filing date.

* cited by examiner

CONNECTION STRUCTURE OF MODULE, STORAGE BOX AND STORAGE BOX ASSEMBLY

CROSS-REFERENCE TO RELATED APPLICATION

The present application is a continuation of U.S. patent application Ser. No. 18/176,907 filed Mar. 1, 2023, the contents of which are incorporated herein by reference.

PRIORITY

This application claims priority to Chinese Patent Application No. 202210212862.5 filed on Mar. 4, 2022; Chinese Patent Application No. 202320135456.3 filed on Jan. 13, 2023. The contents of all of which are hereby incorporated by reference herein.

TECHNICAL FIELD

This invention relates generally to modular storage boxes, and more specifically the connection mechanisms for attaching modular storage boxes.

BACKGROUND INFORMATION

In order to facilitate the user in the case of carrying multiple storage boxes (such as toolboxes) to facilitate the overall movement and use, each storage box is usually stacked together, and each storage box is usually locked together by interlocking, so as to facilitate the user to move and use. A number of ways are known for interlocking storage boxes. Now on the market, there are roughly the following three forms of locking: the first way uses a single plastic latch that can be turned to clasp the lower bottom of the box protrusion to achieve the purpose of interlocking; the second way is the conventional use of the front of the two-segment latch moved to the side to lock between the upper and lower boxes; and the third way uses a combination of steel wire and plastic to lock boxes together at the side. However, the above locking methods can only be interlocked for the same length and width of the shape of the box, and cannot be interlocked for different length and width of the size of the shape of the box, with many professional users needing to carry more and more diverse types of tools, there is an urgent need for interlocking between different sizes of the box.

SUMMARY

The purpose of the present invention is to provide a connection structure of a storage box, aiming to solve the above-mentioned deficiencies of the background technology, and to achieve automatic locking, keeping unlocking and automatic reset functions, so as to facilitate the user's operation and use.

The present invention provides a connection structure of a module comprising a first connection part located on one surface of said module, a second connection part located on another surface of said module and a stop part.

said first connection part comprising a mounting portion, a locking part movable relative to said mounting portion and a first resilient member disposed between said mounting portion and said locking portion, said first resilient member causing said locking part to automatically remain in a locked state said second connection part comprising a mating part interlockable with the locking portion, the locking part of one said module being pressed down so that it is automatically locked with the mating part of the other module by the action of said first resilient member.

When said stop part is in the locking path of the locking portion, said locking part cannot be automatically locked and said first connection part and said second connection part are in a holding unlocked state.

Further, said stop part is retractable, said stop part extending when said first connection part and said second connection part are in a hold unlocked state, and said stop part compressing when said first connection part and said second connection part are in a locked state.

Further, said stop part is provided on said locking part and is movable with said locking portion; when said first connection part and said second connection part are in a holding unlocked state, said stop part and said second connection part snap in the locking path of the locking portion.

Further, said stop part comprises a holding slot opened in the locking portion, a card block accommodated in said holding slot and a second resilient member disposed between the holding slot and the card block; when said second resilient member is extended, said card block extends out of the holding slot and when said second resilient member is compressed, said card block is compressed in the holding slot.

Further, said stop part is provided on said second connection part and remains stationary relative to said locking portion; said stop part and said locking part snap together in a locking path of the locking part when said first connection part is in a hold unlocked state with said second connection part.

Further, said locking part includes a locking clasp and a stop clasp, said locking clasp being provided in correspondence with the mating portion, and said stop clasp being provided in correspondence with the stop part.

Further, said stop clasp has an extension length in the locking direction greater than the extension length of the locking clasp in the locking direction.

Further, when said first connection part and said second connection part are in a hold unlocked state, said stop part and said stop buckle are held against each other in a locked path of the locking portion; when said first connection part and said second connection part are in a locked state, said locking buckle and mating part are locked against each other and said stop buckle is held against the stop part in a non-locked path.

Further, said stop part comprises a holding slot opened in the mating portion, a block to be accommodated in the slot and a second resilient member disposed between the holding slot and the block; when said second resilient member is compressed, said block is held against said stop clasp in a non-locking path, and when said second resilient member is extended, said block is held against said stop clasp in a locking path of the locking portion.

Further, said stop part further comprises a retaining slot and a retaining block attached to the card block, said second resilient member compressing when said retaining block is located in said retaining slot and said stop part is not located in the locking path of the locking portion.

Further, said locking part is a sliding latch for horizontal movement, a flipping latch for flipping movement, or a rotating latch for rotating movement.

The present invention also provides a storage box, said storage box is provided with a connection structure of the module as described in any of the above, said first connection part is provided on the lid of said storage box, said second connection part is provided on the bottom of said storage box body.

The present invention also provides a storage box assembly comprising a plurality of storage boxes as described above, wherein two adjacent said storage boxes are interlockable with each other by means of a first connection member and a second connection member.

The connection structure of the locker provided by the present invention, because the locking part can move relative to the mounting part and the first resilient member can drive the locking part to automatically remain in the locked state, when the two lockers are locked, the locking part of one of the lockers can automatically lock with the mating part of the other locker under the action of the first resilient member, thus realizing the automatic locking function of the first connection part and the second connection part; meanwhile, by At the same time, by setting the stopping part, the stopping part can be held in the locking path of the locking part, so that the first connection part and the second connection part are in the unlocked state, thus eliminating the need to deliberately keep the locking part in the unlocked state by hand, freeing the user's hands; and when the two lockers are unlocked and detached from each other, the locking part can be automatically reset under the drive of the first resilient member, ready for the next locking, simplifying the operation steps when locking. operation steps, convenient for users.

In yet another embodiment, the purpose of the utility model is to provide a connection structure of a storage box, aiming to solve the above-mentioned deficiencies of the background technology, and to be able to achieve automatic locking, holding unlocking and automatic reset functions, so as to facilitate the user's operation and use.

The utility model provides a connection structure of a module, comprising a first connection part located on one surface of said module, a second connection part located on another surface of said module.

said first connection portion comprising a mounting portion, a locking part movable relative to said mounting portion and a first elastic member disposed between said mounting portion and said locking portion, said first elastic member causing said locking part to be automatically maintained in a locked state said second connection portion comprising a mating part interlocked with said locking portion, the locking part of one said module being pressed down so that it is automatically locked with the mating part of the other module by the action of said first resilient member further comprising a stop part, said stop part being provided on said locking part and having one end rotatably connected to said locking portion, said stop part and said second connection portion being held in the locking path of the locking part when said first connection portion and said second connection portion are in a holding unlocked state.

Further, said stop part includes a latch and a second resilient member, one end of said latch being rotatably connected to said locking portion, said second resilient member keeping said latch automatically in the ejected state; when said latch is ejected and held against said mating portion, said locking part is not automatically locked and said first connection portion and said second connection portion are in the hold unlocked state.

Further, said locking part is provided with a holding slot, said holding slot having a bottom wall and two side walls, two said side walls extending upward and opposite each other along both sides of said bottom wall; said latch is retractably provided in said holding slot, one end of said second resilient member resting on said latch and the other end resting on said bottom wall; when said second resilient member is ejected, said latch extends out of said holding slot, and when said second elastic member is compressed, said latch is retracted into said holding slot.

Further, said latch is provided with an upwardly protruding stop; said stop protrudes from said holding slot against said mating part when said first connection part and said second connection part are in a holding unlocked state.

Further, said latch has opposing first and second ends, the second end being closer to the center of the module than the first end; said first end is provided with a shaft hole, said stop further comprising a rotating shaft, said ends of said rotating shaft being fixed to two said side walls, said second resilient member being a torsion spring, said first end and said second resilient member being snapped to said rotating shaft.

Further, said latch has opposing first and second ends, the second end being closer to the center of the module than the first end; said first end being pivotally connected to said locking portion, said second resilient member having both ends located between said latch and said bottom wall, said second resilient member being a telescopic spring.

Further, said second end part is provided with convex shafts on both sides, two said convex shafts are inserted in the slides of two said side walls respectively.

Further, said locking part is a sliding latch for horizontal movement, a flipping latch for flipping movement or a rotating latch for rotating movement.

The utility model also provides a storage box, including a lid and a box body, said lid is set on said box body, said storage box is provided with a connection structure of the module as described in either of the above, said first connection is set on said lid, said second connection is set on the bottom of said box body.

The utility model also provides a storage box assembly comprising a plurality of storage boxes as described above, and two adjacent said storage boxes are interlockable with each other by said first connecting member and said second connecting member.

The connection structure of the storage box provided by the utility model has the following beneficial effects.

1, the use of the first connecting part and the second connecting part with locking. When the upper locker is placed in place at the same time automatically achieve the function of two boxes locked to each other, do not need the user to put the box after the need to lock the box and then deliberately to operate both sides of the latch, only to open when the two sides of the latch can be pulled open.

2, the use of rotatable latch to make the first connection and the second connection in the unlocked state, the movement of the latch deterministic, smooth, greatly improving the convenience of the user.

DETAILED DESCRIPTION OF THE ILLUSTRATED EMBODIMENTS

Figure 1:
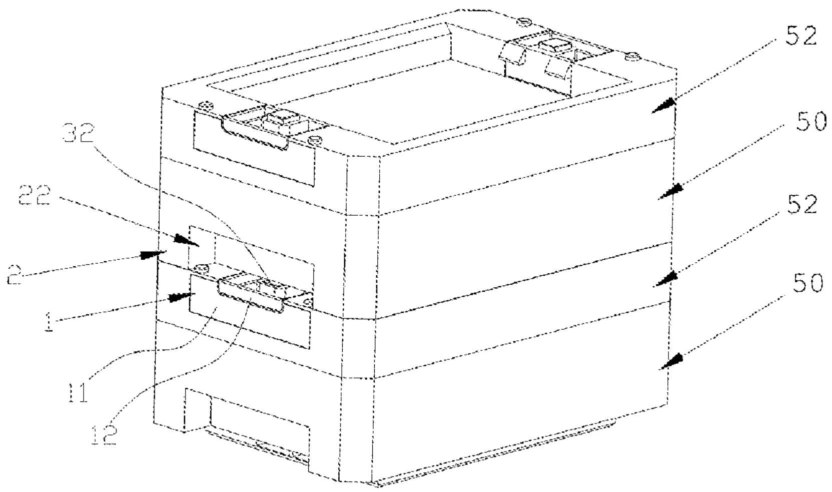
FIG. 1 is a schematic diagram of the three-dimensional structure of the storage box in the first embodiment of the present invention.

The specific embodiments of the present invention are described in further detail below in conjunction with the accompanying drawings and embodiments. The following embodiments are used to illustrate the invention, but are not intended to limit the scope of the invention.

The terms “first”, “second”, “third”, “fourth”, etc. (if present) in the specification and claims of the present invention are used to distinguish between “etc. (if present) are used to distinguish similar objects and need not be used to describe a particular order or sequence.

The orientation words such as top, bottom, left, right, front, back, top, bottom, etc. (if present) covered in the specification and claims of the present invention are defined in terms of the position of the structures in the attached drawings located in the drawings and the position of the structures in relation to each other, only for the clarity and convenience of expressing the technical solution. It should be understood that the use of the orientation words should not limit the scope of protection claimed in this application.

The present invention provides a connection structure of a module, a storage box having the connection structure, and a storage box assembly. The connection structure may be provided on storage box 50, and two adjacent storage boxes 50 may be matingly locked with each other by the connection structure, thereby facilitating the transportation of multiple storage boxes 50. The storage box 50 can be a tool box, tool basket, transport box, transit box and other storage devices. Storage box 50 can be any type known to those skilled in the art, which comprises of a four sidewalls protecting from a bottom with a hinged lid 52 for access to an interior thereof. Storage box 50 can have various types of lid latching mechanisms, organizational bins or structures and other features known to those skilled in the art.

First Embodiment

As shown in FIGS. 1 to 7, this embodiment provides a connection structure for a module that can be provided on a storage box. The connection structure includes a first connection part 1, a second connection part 2 and a stopping part 3. The first connection part 1 and the second connection part 2 can be automatically locked with each other; the stopping part 3 can make the first connection part 1 and the second connection part 2 unable to be automatically locked after unlocking, so that the first connection part 1 and the second connection part 2 can be kept in an unlocked state, which is convenient for the first connection part 1 and the second connection part 2 to be unlocked and separated from each other, freeing the user to use with both hands.

Figure 6:
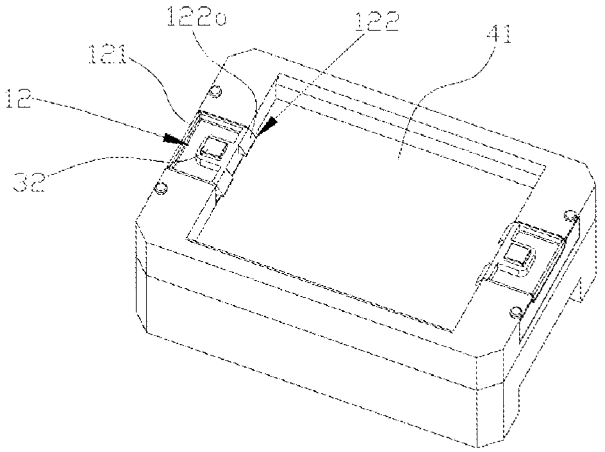
FIG. 6 is another three-dimensional view of a storage box in FIG. 4.
Figure 7:
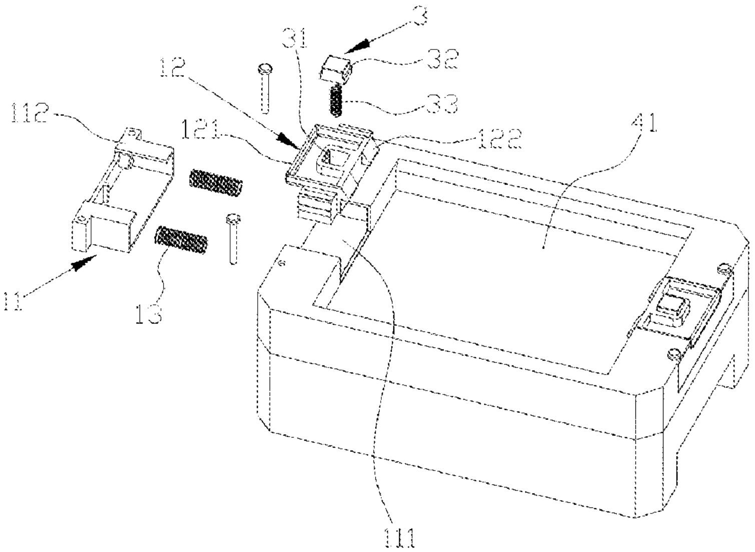
FIG. 7 is an exploded schematic diagram of part of the structure in FIG. 6.
Figure 8:
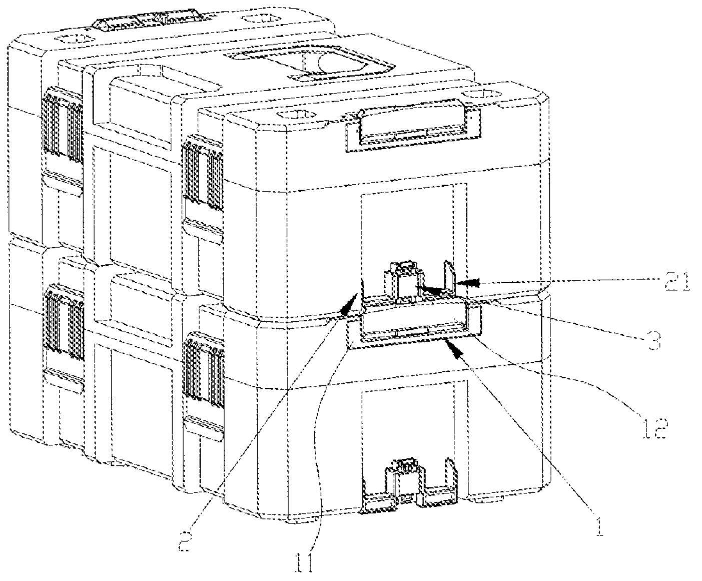
FIG. 8 is a schematic diagram of the three-dimensional structure of the storage box in the second embodiment of the present invention.

Further, as shown in FIGS. 6 and 7, in this embodiment, the first connecting part 1 is provided on the lid of the storage box, which includes a mounting portion 11, a locking part 12 movable relative to the mounting portion 11 and a first resilient member 13 located between the mounting portion 11 and the locking part 12, and the locking part 12 can be automatically kept in the locked state under the action of the first resilient member 13. In addition, in order to facilitate the positioning of the first connecting part 1 and the second connecting part 2 when interlocking, a positioning slot 41 may be provided on the lid, and the positioning slot 41 may just accommodate the bottom of the box, and the first connecting part 1 may be provided at the edge of the positioning slot 41. In other embodiments, the positioning slot 41 can be positioned with the projections provided on the bottom of the box body for positioning when the upper and lower storage boxes are stacked.

Further, as shown in FIG. 7, in this embodiment, the mounting portion 11 is fixedly connected to the box lid. The mounting portion 11 includes a mounting slot 111 in the lid and a mounting body 112 in the mounting slot 111, which can be bolted into the mounting slot 111. In other embodiments, the mounting body 112 may also be integrally formed with the mounting slot 111, or fixedly connected by means such as snap-on.

Further, as shown in FIG. 7, in this embodiment, the locking part 12 may be housed within the mounting body 112, which may be movable relative to the mounting body 112. The locking part 12 is a sliding latch that moves horizontally relative to the mounting portion 11, thereby allowing the locking part 12 to move horizontally within the mounting slot 111. In other embodiments, the locking part 12 may also be a flip latch that moves in a flip relative to the mounting portion 11, or a rotary latch that moves in a rotational manner relative to the mounting portion 11. The locking part 12 includes a locking body 121 that can be accommodated in the mounting body 112 and a locking buckle 122 located on the side of the locking body 121 near the center of the storage box; when the locking buckle 122 extends out of the mounting portion 11 (i.e., the locking buckle 122 extends into the positioning slot 41), the first connection part 1 and the second connection part 2 can be interlocked, and when the locking buckle 122 does not extend out of the mounting portion 11 (i.e., the locking buckle 122 does not extend into the positioning slot 41) When the locking buckle 122 does not extend out of the mounting portion 11 (i.e., the locking buckle 122 does not extend into the positioning slot 41), the first connecting part 1 and the second connecting part 2 can be unlocked. Also, to facilitate locking between the locking buckle 122 and the second connection part 2, the locking buckle 122 is provided with a bevel 122*a*.

Further, as shown in FIG. 7, in this embodiment, the first resilient member 13 is located between the locking body 121 and the mounting body 112, so that the locking part 12 is automatically kept in the locked state by the action of the first resilient member 13. At the same time, in order to improve the reliability of the movement of the locking part 12, the first resilient member 13 can be provided with two, respectively located at the two ends of the locking body 121. The first resilient member 13 is a compression spring, so that the locking part 12 moves horizontally; in other embodiments, the first resilient member 13 may also be a torsion spring, so that the locking part 12 moves overturned.

Figure 5:
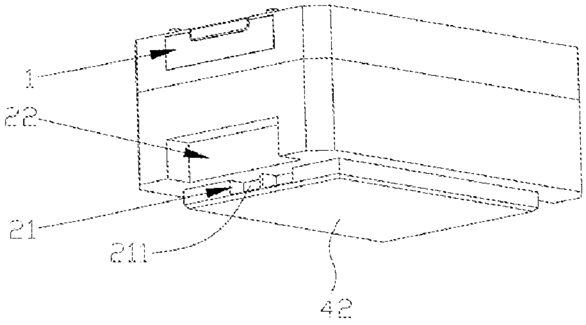
FIG. 5 is a three-dimensional view of a storage box in FIG. 4.

Further, as shown in FIG. 5, in this embodiment, the second connection part 2 is provided at the bottom of the box of the storage box, which includes a mating part 21 that can be interlocked with the locking part 12 and a recessed part 22 that can be interlocked with the stopping part 3, and the locking part 12 of one storage box can be automatically locked with the mating part 21 of another storage box under the action of the first resilient member 13 by pressing down. In addition, in order to facilitate the interlocking of the mating part 21 and the locking buckle 122, a projection 42 (here the projection 42 is the bottom of the box) can be provided on the bottom of the box, and the projection 42 can be just accommodated in the positioning slot 41. When the first connection part 1 and the second connection part 2 are in the locked state, the locking buckle 122 interferes with the mating part 21; when the first connection part 1 and the second connection part 2 are in the keep unlocked state, the locking buckle 122 does not interfere with the mating part 21, and the stopping part 3 snaps with the recessed part 22. In other embodiments, when the first connection part 1 and the second connection part 2 are in the unlocked state, the stopping part 3 can be directly held with the mating part 21. In addition, the mating part 21 is a number of slots 211, and the number of slots 211 may correspond to the number of locking buckles 122.

Further, as shown in FIG. 6 and FIG. 7, in this embodiment, the stopping part 3 is provided on the locking part 12, which can move horizontally with the locking part 12, and when the locking part 12 is in the unlocked state, the stopping part 3 can be held with the second connection part 2 in the locking path of the locking part 12, and the locking part 12 cannot be automatically locked, so that the first connection part 1 and the second connection part 2 are in the maintained unlocked state. The stopping part 3 includes a holding slot 31 opened on the locking part 12, a card block 32 that can be accommodated in the holding slot 31 and a second resilient member 33 disposed between the holding slot 31 and the card block 32, and the card block 32 can be retracted relative to the holding slot 31 under the action of the second resilient member 33. Holding slot 31 has a bottom wall and two side walls, two said side walls extending upward along both sides of said bottom wall and set opposite each other.

Figure 2:
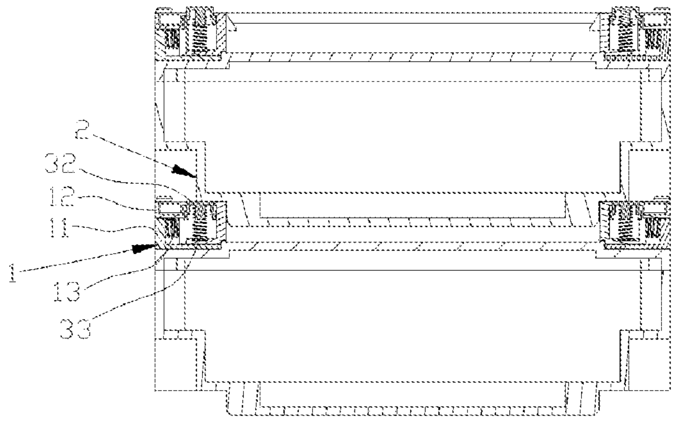
FIG. 2 is a cross-sectional view of FIG. 1.
Figure 3:
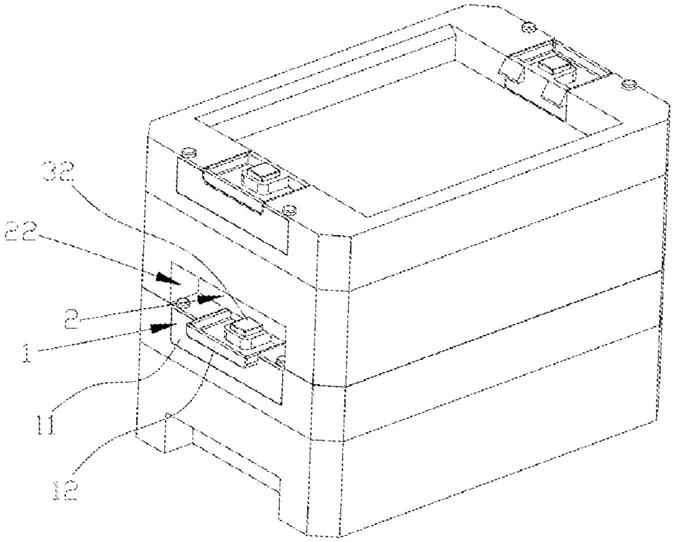
FIG. 3 is a schematic diagram of another three-dimensional structure of the storage box in the first embodiment of the present invention.
Figure 4:
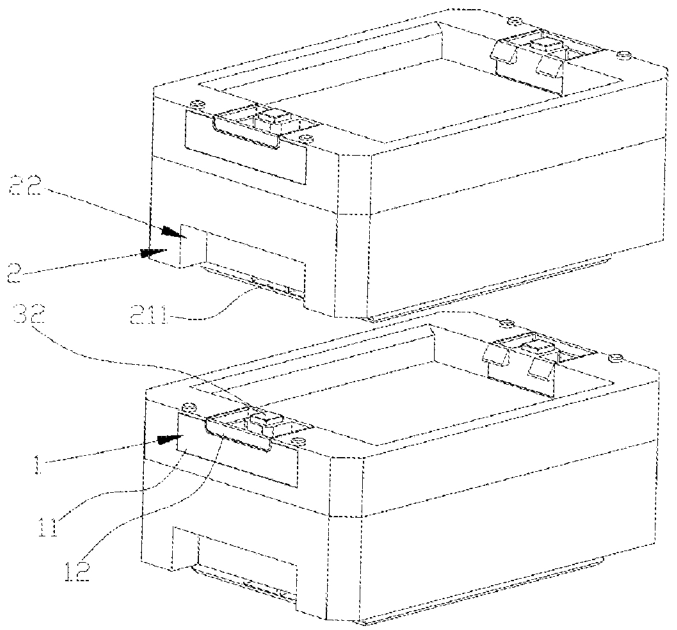
FIG. 4 is a schematic diagram of the partially exploded structure of FIG. 3.

Specifically, as shown in FIG. 3, when the first connection part 1 and the second connection part 2 are in a holding unlocked state, the second resilient member 33 extends and the card block 32 extends into the holding slot 31; as shown in FIGS. 1 and 2, when the first connection part 1 and the second connection part 2 are in a locked state, the second resilient member 33 compresses and the card block 32 is compressed in the holding slot 31 by the compression of the second connection part 2.

The working principle of this embodiment is as follows.

When it is necessary to lock two storage boxes up and down, press down the upper storage box to make it contact with the locking buckle 122 on the lower storage box, the locking buckle 122 on the lower storage box is squeezed to drive the locking part 12 to move towards the unlocking direction (i.e. away from the center of the storage box), at this time the first resilient member 13 compresses and accumulates force. When the upper locker moves down a certain distance, the locking buckle 122 on the locking part 12 corresponds to the slot 211 on the matching part 21, the locking buckle 122 loses the holding effect of the upper locker, the locking buckle 122 is driven by the first resilient member 13 automatically stuck into the slot 211, so that the first connection part 1 and the second connection part 2 are in a locked state, that is, to achieve the automatic locking function of the upper and lower locker. At this time, the stopping part 3 is compressed in the holding slot 31 by the compression of the second connection 2.

When it is necessary to unlock the two storage boxes, pull the locking part 12 of the lower storage box outward so that it moves toward the unlocking direction, and when the locking part 12 moves a certain distance toward the unlocking direction, the locking buckle 122 of the lower storage box is detached from the slot 211 of the upper storage box, so that the locking part 12 is unlocked with the mating part 21. At the same time, continue to pull the locking part 12 in the unlocking direction until the stopping part 3 loses the squeeze of the upper storage box, and the card block 32 automatically extends upward under the action of the second resilient member 33 to hold the holding slot 31 and snap with the recessed part 22, so that the first connection part 1 and the second connection part 2 are in the keep unlocked state, i.e., the keep unlocked function is realized. At this time, the upper and lower storage boxes can be easily unlocked and separated by simply pulling up the upper storage box. At the same time, at this time, if the user wants to lock again, just press down the card block 32 to make the card block 32 retracted into the holding slot 31. When the upper and lower two lockers separated, the card block 32 in the second resilient member 33 under the action of the extension state, the locking part 12 in the first resilient member 13 driven automatically reset in the locked state, ready for the next lock.

The advantages of the connection structure of the storage box provided in this embodiment include.

1. the connection structure of the locker has an automatic locking function, a hold unlocking function and an automatic reset function: since the locking part 12 can move horizontally relative to the mounting part 11, and the first resilient member 13 can drive the locking part 12 to automatically remain in the locked state. When two lockers are locked, the locking part 12 of one of the lockers can automatically lock with the mating part 21 of the other locker under the action of the first resilient member 13, thus realizing the automatic locking function of the first connection part 1 and the second connection part 2; at the same time, by setting the stopping part 3 and using the stopping part 3 to cooperate with the second connection part 2, the first connection part 1 and the second connection part 2 can be kept in the unlocked state when they are unlocked At the same time, after the two lockers are unlocked and separated, the locking part 12 can be automatically reset under the drive of the first resilient member 13 to prepare for the next locking, simplifying the operation steps of locking and unlocking (conventional locking and unlocking requires at least four steps, while this embodiment only requires two steps), which is convenient for users.

2, through the cooperation of the stop part 3 and the second connection part 2 to keep the unlocking function, when the user wants to re-lock (user miss-operation unlocking), just press the card block 32 downward, without separating the first connection part 1 and the second connection part 2 after re-locking, and does not harm the reliability of the structure.

Second Embodiment

As shown in FIGS. 8 to 14, this embodiment differs from the first embodiment in that the locking part 12 is a flip latch and the stopping part 3 is provided on the second connection part 2 and remains stationary with respect to the locking part 12. When the first connection part 1 and the second connection part 2 are in the hold unlocked state, the stopping part 3 and the locking part 12 snap in the locking path of the locking part 12.

Specifically, the locking part 12 includes a locking buckle 122 and a stopper 123, the locking buckle 122 can be locked with the mating part 21 in cooperation with each other, and the stopper 123 is provided in correspondence with the stopping part 3; the stopper 123 can be held with the stopping part 3 in the locking path of the locking part 12, so that the first connecting part 1 and the second connecting part 2 are in the hold unlocked state. The extension length of the locking buckle 122 in the locking direction is smaller than the extension length of the stopper 123 in the locking direction, so that the angle required to flip when the stopper 123 and the stopping part 3 are unlocked in the locking path is maximum. When the second resilient member 33 is compressed, the locking buckle 122 and the mating part 21 are locked to each other, the card block 32 and the stopper 123 are held up and down in the vertical direction, and the first connecting part 1 and the second connecting part 2 are in the locked state; when the second resilient member 33 is extended, the card block 32 extends into the holding slot 31 and is held in the locked path with the stopper 123, and the first connecting part 1 and the second connecting part 2 are in the hold unlocked state. In other embodiments, the card block 32 and the stopper 123 can also be held in other non-locking paths, for example, the card block 32 and the stopper 123 are held in the left and right direction, and the stopper 123 only needs to hold the card block 32 in the non-locking path to fall within the scope of protection of the present invention.

Figure 9:
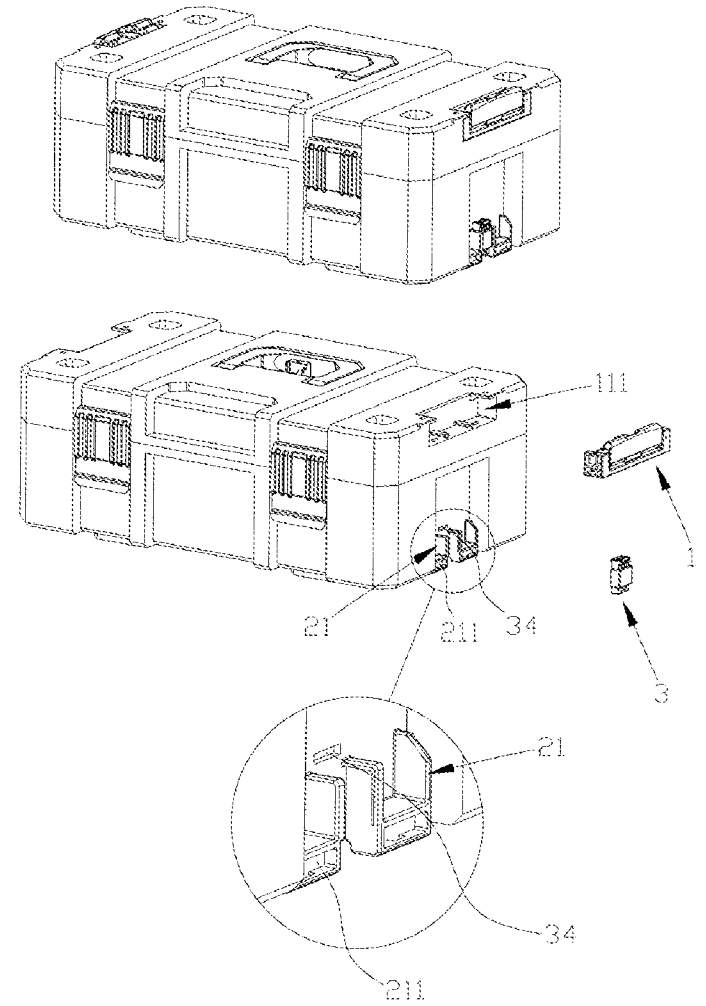
FIG. 9 is a schematic diagram of the partially exploded structure of FIG. 8.
Figure 10:
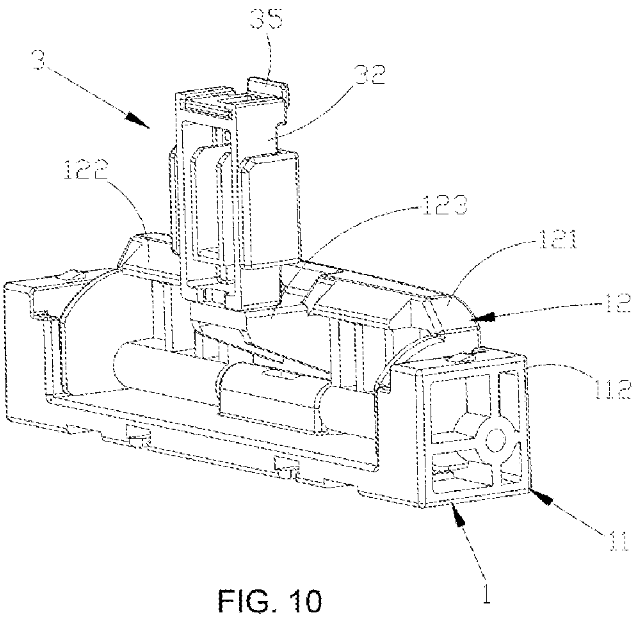
FIG. 10 is a schematic diagram of the structure of the mating relationship between the suspended and locked portions of FIG. 8.
Figure 11:
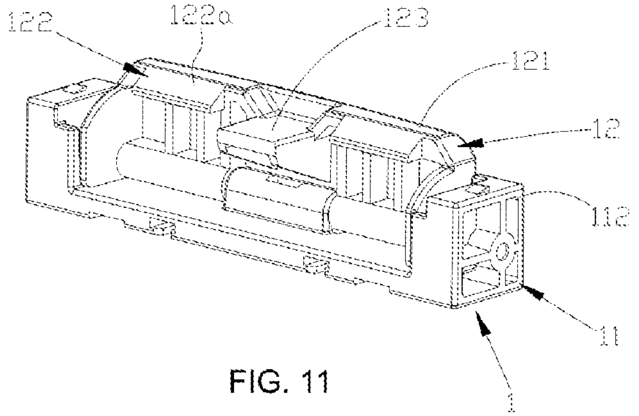
FIG. 11 is a schematic diagram of the structure of the first connecting part in FIG. 10.
Figure 12:
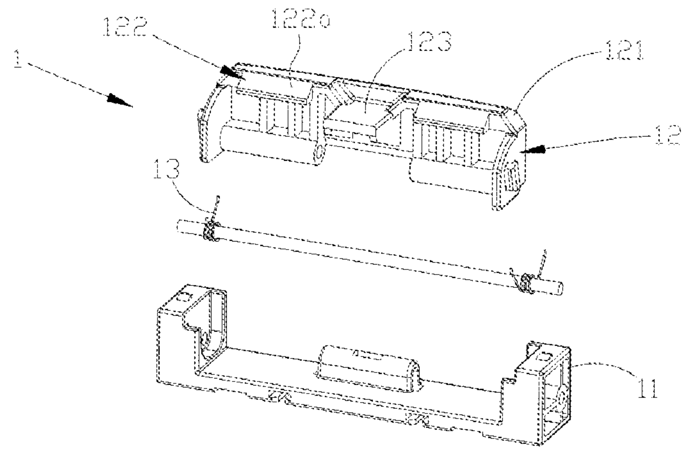
FIG. 12 is a schematic diagram of the exploded structure of FIG. 11.
Figure 13:
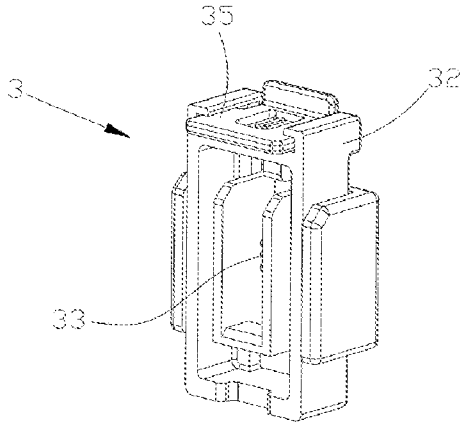
FIG. 13 is a schematic diagram of the structure of the aborting part of FIG. 10.
Figure 14:
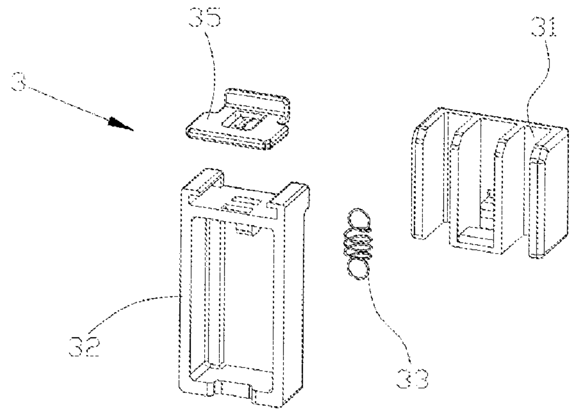
FIG. 14 is a schematic diagram of the exploded structure of FIG. 13.

Further, as shown in FIG. 9 and FIG. 13, in this embodiment, the stopping part 3 also includes a fixing slot 34 opened on the second connection part 2 and a fixing block 35 located at the end of the card block 32 away from the second resilient member 33, and the fixing block 35 can be slid into the fixing slot 34. When the fixing block 35 is located in the fixing slot 34, the second resilient member 33 compresses so that the stopping part 3 is always fixed above the stopper 123; such a setting allows the hold unlock function to be selectively opened and closed for the convenience of the user. In other embodiments, it is also possible to open a fixing slot 34 on the first connecting part 1, as long as the stopping part 3 cannot be located in the locking path of the locking part 12 (i.e. the stopping part 3 part cannot be in contact with the stopper 123), that is, it falls within the scope of protection of the present invention.

The working principle of this embodiment is as follows.

When the need to lock the two storage boxes up and down, downward pressure on the upper storage box so that it is in contact with the locking buckle 122 on the lower storage box, the locking buckle 122 of the lower storage box is squeezed to drive the locking part 12 towards the unlocking direction (i.e., away from the center of the storage box), when the first resilient member 13 compressed storage force. When the upper locker moves down a certain distance, the locking buckle 122 on the locking part 12 corresponds to the slot 211 on the mating part 21, the locking buckle 122 loses the holding effect of the upper locker, the locking buckle 122 is driven by the first resilient member 13 automatically stuck into the slot 211, so that the first connection part 1 and the second connection part 2 are in a locked state, that is, to achieve the automatic locking function of the upper and lower locker. It should be noted that during this process, the upper storage box is pressed down, the card block 32 is squeezed and compressed by the stopper 123, the second resilient member 33 compresses and accumulates force, and the stopper 123 and the card block 32 are always held against the upper and lower.

When it is necessary to unlock the two storage boxes, pull the locking part 12 of the lower storage box outward to make it move in the direction of unlocking, and when the locking part 12 moves outward a certain distance, the locking buckle 122 of the lower storage box is detached from the slot 211 of the upper storage box, so that the locking part 12 is unlocked with the mating part 21. At the same time, continue to pull the locking part 12 outward until the stopping part 3 loses the hold of the stopper 123 of the lower storage box, and the card block 32 automatically extends downward under the action of the second resilient member 33 to hold the holding slot 31 and snap with the stopper 123 in the locking path of the locking part 12, so that the first connection part 1 and the second connection part 2 are in the hold unlocked state, that is, to achieve the hold unlocking function. At this time, the upper and lower storage boxes can be easily unlocked and separated by simply pulling up the upper storage box. At the same time, at this time, if the user wants to lock again, just pull up the card block 32 to make the card block 32 and stop the stopper 123 up and down again can be held. When the upper and lower two lockers separated, the card block 32 in the role of the second resilient member 33 to maintain the extended state, the locking part 12 in the first resilient member 13 driven automatically reset in the locked state, ready for the next lock.

The connection structure of the storage box provided in this embodiment also has automatic locking function, keep unlocking function and automatic reset function, and other structures and functions of this embodiment are the same or similar to the first embodiment, and will not be repeated here.

Third Embodiment (FIGS. 15-26)

Figure 15:
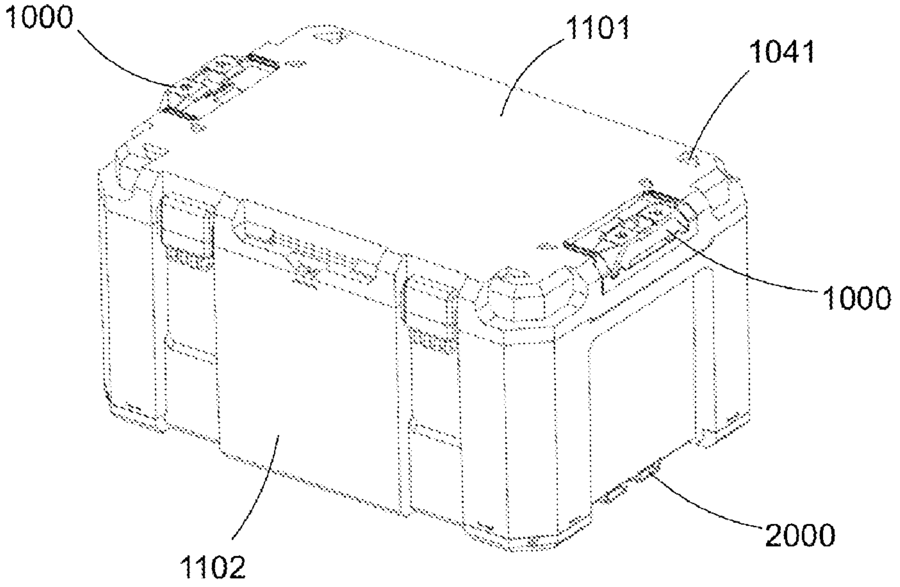
FIG. 15 is a schematic diagram of the three-dimensional structure of the storage box in the first embodiment of the utility model.
Figure 16:
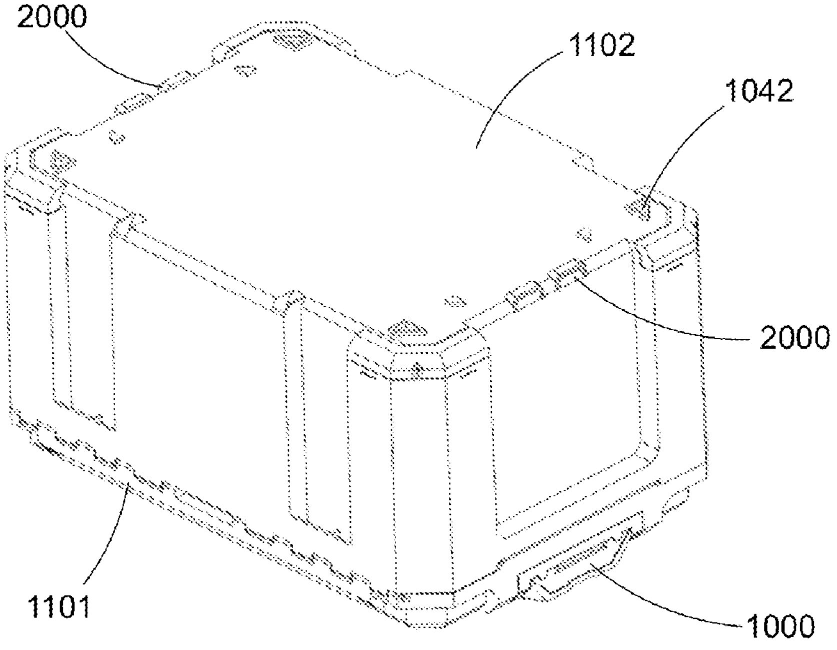
FIG. 16 is a schematic diagram of another three-dimensional structure of the storage box in the first embodiment of the utility model.
Figure 17:
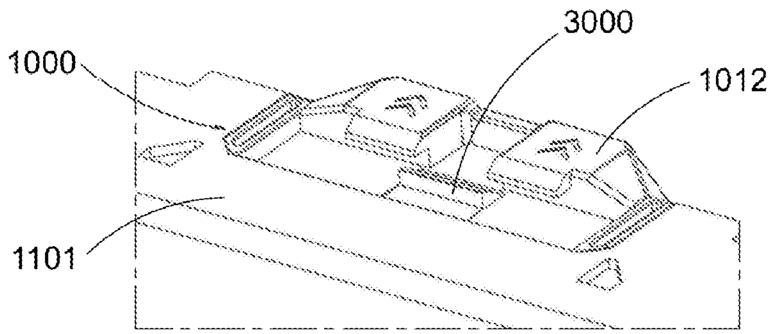
FIG. 17 is a schematic diagram of the partial structure of the storage box in the first embodiment of the utility model.
Figure 18:
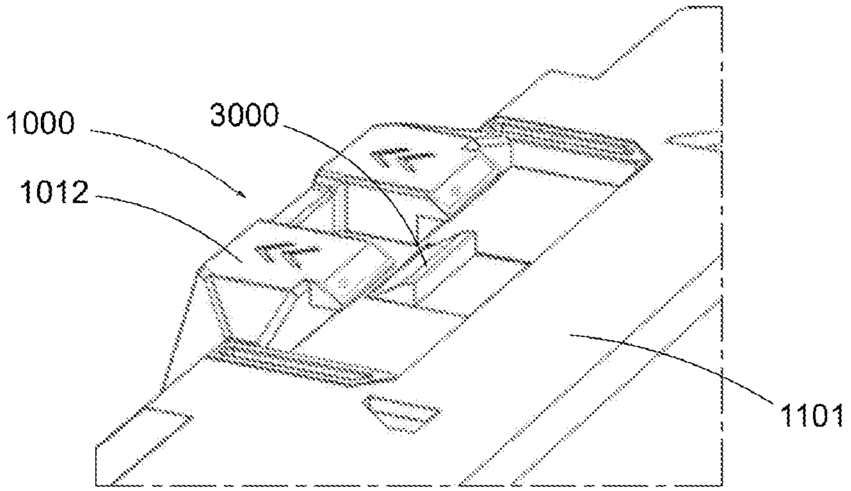
FIG. 18 is a schematic diagram of the structure of another view of FIG. 17

As shown in FIGS. 15 to 16, this embodiment provides a connection structure of a module that can be provided on a storage box. The connection structure includes a first connection part 1000, a second connection part 2000 and a stopper 3000. The first connection part 1000 and the second connection part 2000 can be automatically locked with each other; the stopper 3000 can make the first connection part 1000 and the second connection part 2000 unable to be automatically locked after unlocking, so that the first connection part 1000 and the second connection part 2000 can be kept in the unlocked state, which is convenient for the first connection part 1000 and the second connection part 2000 to be unlocked and separated from each other, freeing the user's It is easy for the user to use with both hands.

In this embodiment, the storage box includes a lid 1101 and a box 1102, and the lid 1101 is set on the box 1102. The lid 1101 can be opened or closed relative to the box 1102. The first connection part 1000 is provided on the lid 1101 of the storage box, and the first connection part 1000 includes a mounting portion 1011, a locking part 1012 that can be moved horizontally relative to the mounting portion 1011 and a first elastic member 1013 located between the mounting portion 1011 and the locking part 1012, and the locking part 1012 can be automatically kept in the locked state under the action of the first elastic member 1013.

Further, the mounting portion 1011 is removably connected to the lid 1101. The lid 1101 is provided with a mounting slot 1111, and the mounting portion 1011 is snap-fitted into the mounting slot 1111, thereby facilitating the replacement of the mounting portion 1011. In other embodiments, the first connection part 1000 and the lid 1010 may be integrally formed or otherwise fixed or removably connected. The mounting portion 1011 is provided with a slide 1011*a* on the side of the mounting portion 1011 away from the lid 1101, and the locking part 1012 is provided in the slide 1011*a* and can be moved relative to the mounting portion 1011 in the slide 1011*a*. In this embodiment, the locking part 1012 is a sliding latch that moves horizontally relative to the mounting portion 1011 so that the locking part 1012 moves horizontally within the slide 1011*a*. In other embodiments, the locking part 1012 may also be a flip latch that moves with respect to the mounting portion 1011, or a rotary latch that moves with respect to the mounting portion 1011.

Specifically, the locking part 1012 is provided with a locking buckle 1122, with the projection of the locking buckle 1122 directed toward the center side of the storage box. When the locking buckle 1122 is stuck into the second connection part 2000, the first connection part 1000 and the second connection part 2000 can be interlocked, and when the locking buckle 1122 is disengaged from the second connection part 2000, the first connection part 1000 and the second connection part 2000 can be interlocked. At the same time, in order to facilitate the locking between the locking buckle 1122 and the second connection part 2000, the locking buckle 1122 is provided with a bevel 1122*a*. The locking part 1012 is provided with a holding slot 1123 on the side face away from the lid 1101, and the holding slot 1123 is located on the side of the locking buckle 1122 near the lid 1101. The holding slot 1123 has a bottom wall 1123*a* and two side walls 1123*b*, the two side walls 1123*b* extend upward along both sides of the bottom wall 1123*a* and are set opposite each other, and the stopper 3000 is set in the holding slot 1123.

Further, the first elastic member 1013 is connected between the mounting portion 1011 and the locking part 1012, and one end of the first elastic member 1013 abuts against the mounting portion 1011 and the other end abuts against the locking part 1012, so that the locking part 1012 is automatically kept in the locked state under the action of the first elastic member 1013. In order to improve the reliability of the movement of the locking part 1012, the first elastic member 1013 can be provided with two, respectively located on both sides of the slide 1011*a*. The first elastic member 1013 is a telescopic spring, so that the locking part 1012 moves horizontally.

Figure 20:
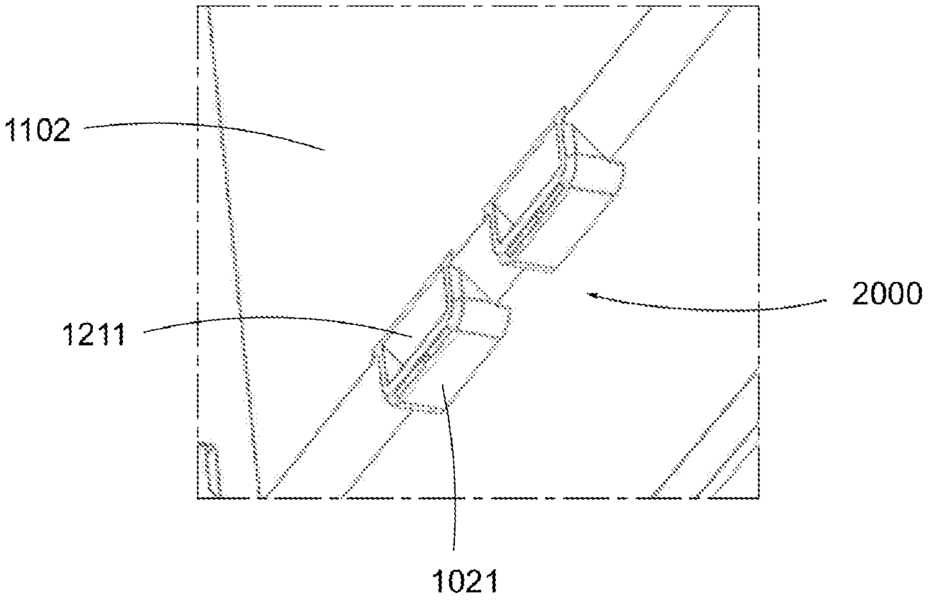
FIG. 20 is a schematic diagram of another local structure of the storage box in the first embodiment of the utility model.

Further, as shown in FIG. 16 and FIG. 20, the second connection part 2000 is provided at the bottom of the box 1102 of the storage box, which includes the mating part 1021 interlocked with the locking buckle 1122 of the locking part 1012, and the locking part 1012 of one storage box can be automatically locked with the mating part 1021 of another storage box by the action of the first elastic member 1013 by pressing down. The mating part 1021 is a number of slots 1211, the number of slots 1211 can be set corresponding to the number of locking buckle 1122.

The stopper 3000 is provided on the locking part 1012, and one end of it is rotatably connected with the locking part 1012. The stopper 3000 includes a card block 1036 and a second resilient member 1033, and one end of the card block 1036 is rotatably connected to the locking part 1012, and the second resilient member 1033 keeps the card block 1036 in the ejected state automatically, and when the card block 1036 is ejected and held against the mating part 1021, the locking part 1012 cannot be locked automatically, and the first connection part 1000 and the second connection part 2000 are in the unlocked state. The locking part 1012 can be locked automatically when the stopper 3000 is retracted into the locking part 1012 by pressing down. When the first connection part 1000 and the second connection part 2000 are in the locked state, the locking buckle 1122 interferes with the mating part 1021 and the stopper 3000 retracts into the locking part 1012; when the first connection part 1000 and the second connection part 2000 are in the keep unlocked state, the locking buckle 1122 does not interfere with the mating part 1022 and the stopper 3000 snaps with the mating part 1021 in the locking path of the locking part 1012.

In this embodiment, the card block 1036 is telescopically provided in the holding slot 1123 of the locking part 1012 and is also horizontally movable with the locking part 1012 relative to the mounting portion 1011, with the length of the card block 1036 extending in the same direction as the moving direction of the locking part 1012. One end of the second resilient member 1033 rests on the card block 1036 and the other end rests on the bottom wall 1123*a*, and when the second resilient member 1033 is popped out, the card block 1036 extends into the holding slot 1123, and when the second resilient member 1033 is compressed, the card block 1036 is retracted into the said holding slot 1123. Specifically, the card block 1036 is provided with an upwardly protruding stop 1361, which extends out of the holding slot 1123 to be held against the mating part 1021 when the first connecting part 1000 and the second connecting part are in a holding unlocked state, and the stop 1361 is used to be held against the mating part 1021. The card block 1036 has an opposite first end 1036*a* and a second end 1036*b*, and the second end 1036*b* is closer to the center of the storage box than the first end 1036*a*, and the stop 1361 is provided at the connection of the first end 1036*a* and the second end 1036*b*.

Figure 19:
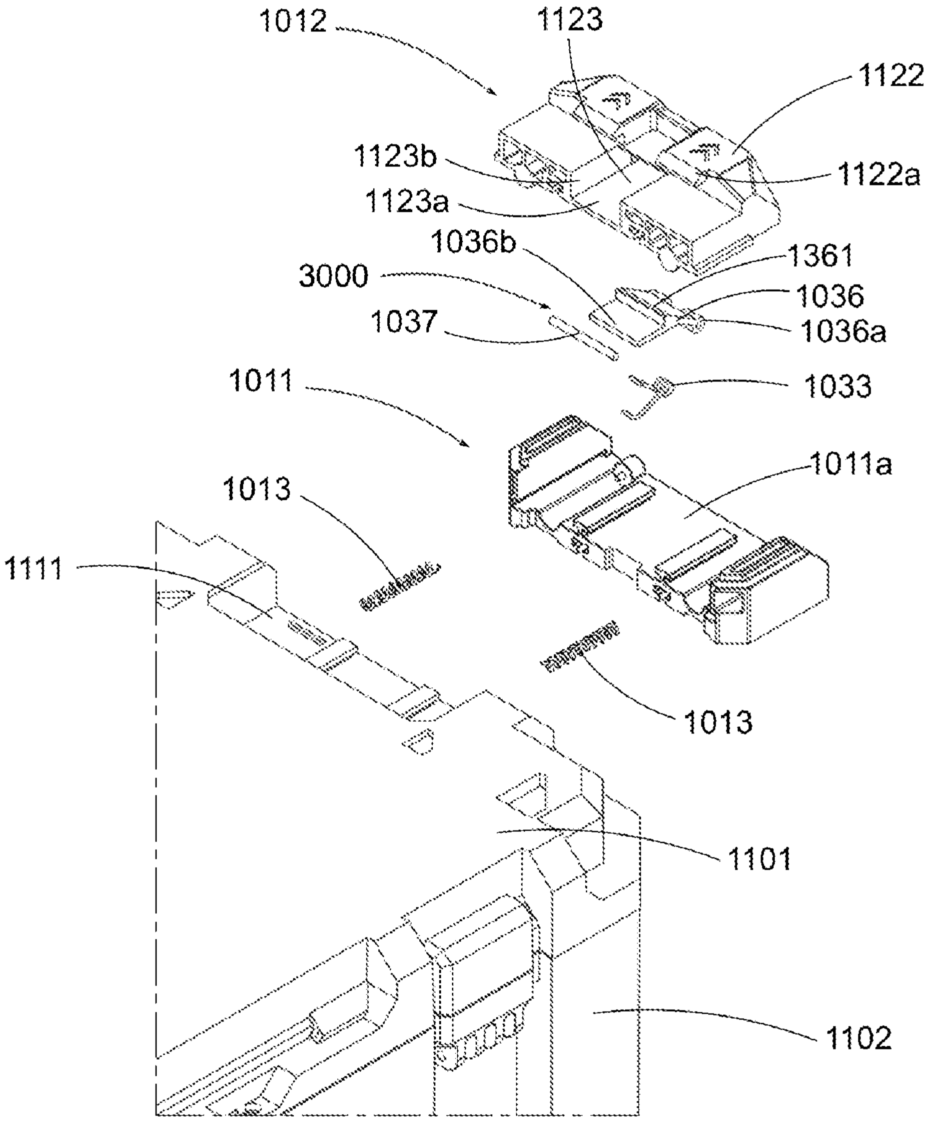
FIG. 19 is a schematic diagram of the partial explosion structure of the storage box in the first embodiment of the utility model.

Further, as shown in FIG. 19, the stopper 3000 also includes a rotating shaft 1037, the two ends of the rotating shaft 1037 are fixed on the two side walls 1123*b*; the second resilient member 1033 is a torsion spring, the first end 1036*a* of the card block 1036 is provided with a shaft hole (not marked in the figure), the first end 1036*a* of the card block 1036 and the second resilient member 1033 are set on the rotating shaft 1037, and the two torsion arms of the second resilient member 1033 are against the card block 1036 and the bottom wall 1123*a*. Further, the first end 1036*a* has a force surface, the stopper 1361 has a holding surface, and the second end 1036*b* has a positioning surface, which intersects the holding surface at approximately right angles. The positioning surface cooperates with the holding surface against the side and bottom surfaces of the mating part 1021 to limit the position of the card block 1036 and thus the position of the locking part 1012. The force surface is used to receive compression from the mating part 1021 or for manual pressure by the user. When the first connection part 1000 and the second connection part 2000 are in a holding unlocked state, the second resilient member 1033 extends and the stop 1361 extends upward into the holding slot 1123; when the first connection part 1000 and the second connection part 2000 are in a locked state, the second resilient member 1033 compresses and the stop 1361 is compressed in the holding slot 1123 by the compression of the bottom surface of the mating part 1021.

In addition, in order to facilitate the positioning of the first connecting part 1000 and the second connecting part 2000 when they are interlocked, a positioning recess 1041 can be provided on the lid 1101, and a projection 1042 can be provided at the bottom of the box 1102, and the positioning recess 1041 can just accommodate the projection 1042, and the first connecting part 1000 can be provided on both sides of the edge of the lid 1101.

The working principle of this embodiment is as follows.

Figure 21:
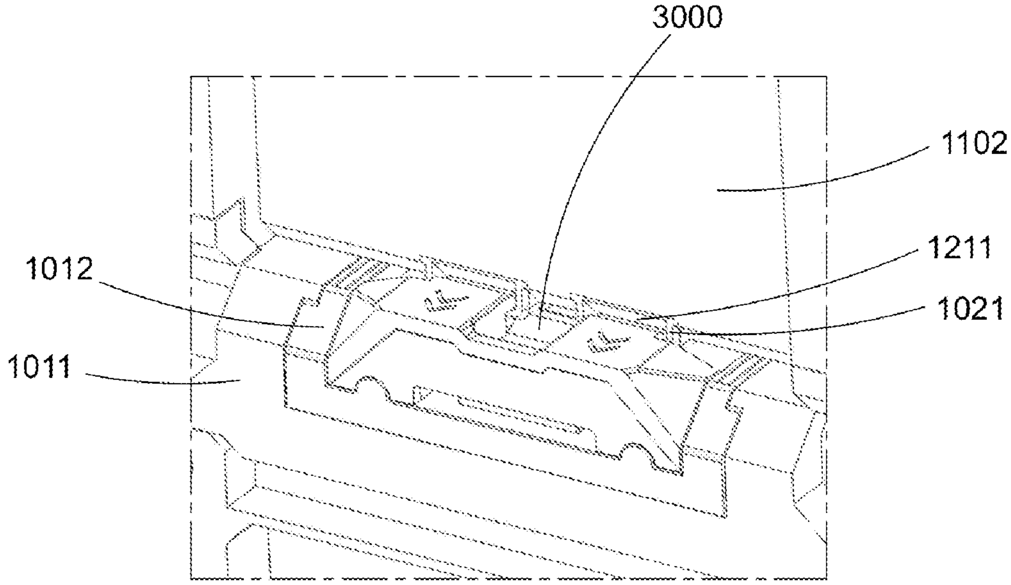
FIG. 21 is a schematic diagram of the local structure of the two storage boxes in the locked state.
Figure 22:
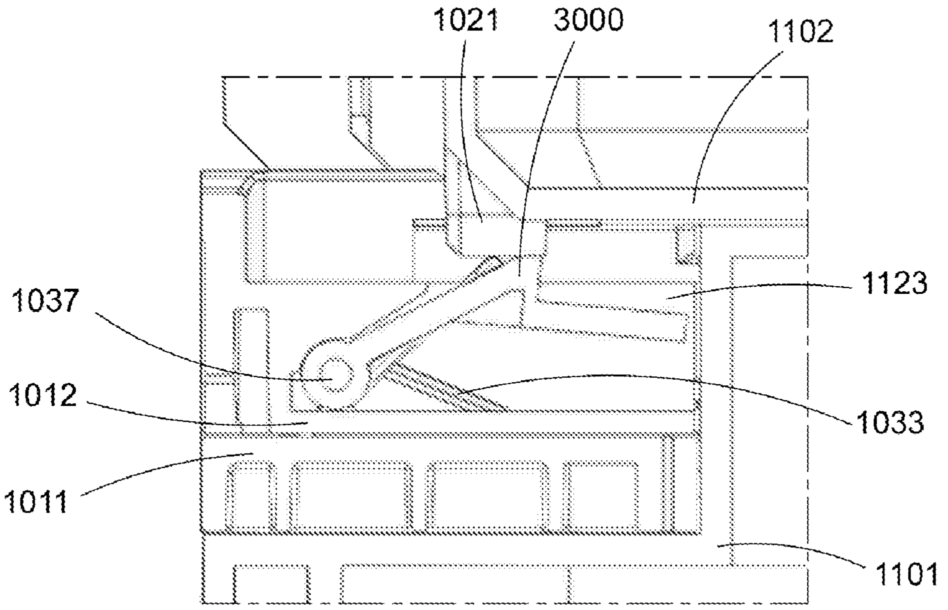
FIG. 22 is a cross-sectional view of another view of FIG. 21.

As shown in FIG. 21 and FIG. 22, when two storage boxes need to be locked up and down, press down the upper storage box so that the mating part 1021 of the second connection part 2000 contacts the locking buckle 1122 on the lower storage box and squeezes the bevel 1122*a*, the locking buckle 1122 of the lower storage box is squeezed to drive the locking part 1012 of the first connection part 1000 to move in the direction of unlocking (i.e., away from the center of the storage box), at this time the first elastic member 1013 At this time, the first elastic member 1013 compresses and accumulates force, and the stopper 3000 simultaneously accepts the extrusion of the second connecting part 2000 and then rotates downward and retracts into the holding slot 1123. When the upper storage box moves down a certain distance, the locking buckle 1122 on the locking part 1012 corresponds to the slot 1211 on the matching part 1021, the locking buckle 1122 loses the resistance of the upper storage box, and the locking buckle 1122 automatically snaps into the slot 1211 under the drive of the first elastic member 1013, so that the first connection part 1000 and the second connection part 2000 are in the locked state, i.e., the automatic locking function of the upper and lower storage boxes is realized. At this time, the stopper 3000 is completely retracted into the holding slot 1123.

Figure 23:
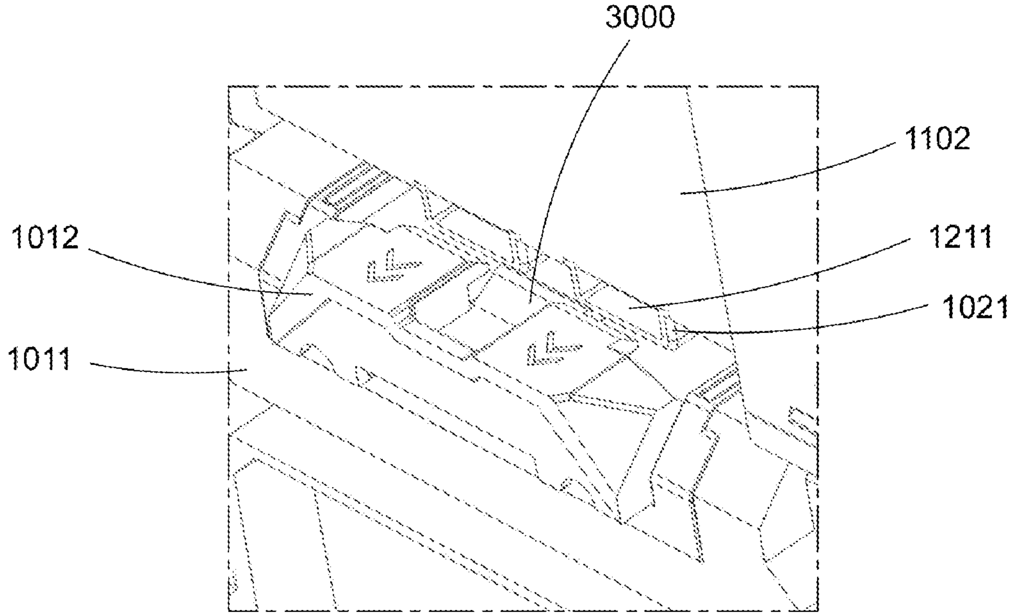
FIG. 23 is a schematic diagram of the local structure of the two lockers when they are in the hold unlocked state.
Figure 24:
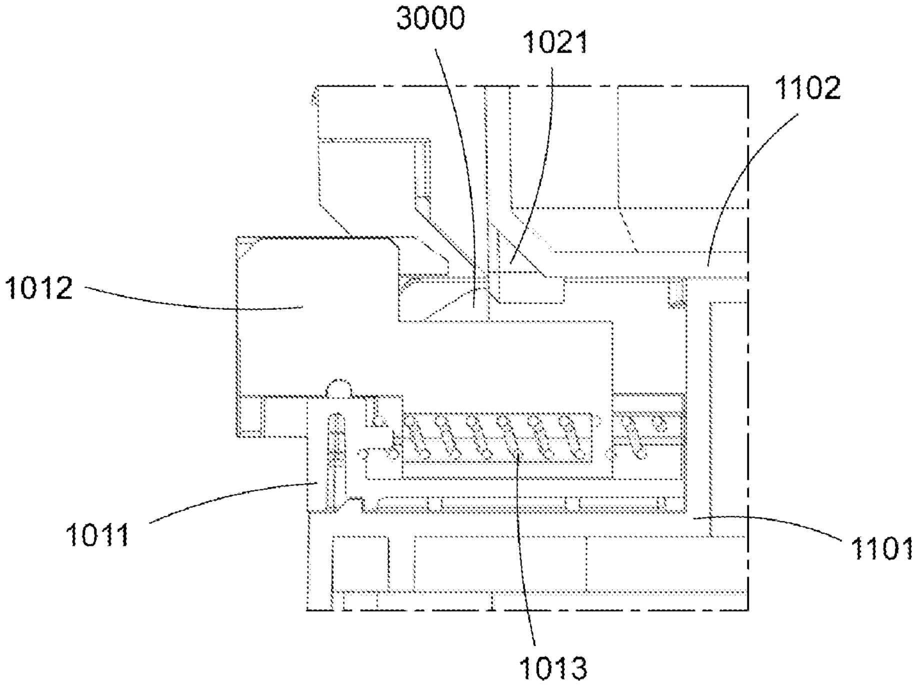
FIG. 24 is a cross-sectional view of another viewpoint of FIG. 23.

As shown in FIGS. 23 and 24, when it is necessary to unlock the two storage boxes, the locking part 1012 of the lower storage box is pulled outward so that it moves in the unlocking direction, and when the locking part 1012 moves a certain distance in the unlocking direction to the unlocking position, the locking buckle 1122 of the lower storage box is detached from the slot 1211 on the mating part 1021 of the upper storage box, thereby unlocking the locking part 1012 and the mating part 1021. At the same time, the stopper 3000 loses the squeeze of the second connection part 2000 of the upper storage box, and the card block 1036 automatically extends upward under the action of the second resilient member 1033 to hold the side of the holding slot 1123 and the mating part 1021, so that the first connection part 1000 and the second connection part 2000 are in the unlocked state, i.e., the unlocking function is achieved. At this time, it is convenient to unlock and separate the upper and lower storage boxes by simply pulling up the upper storage box, while the locking part 1012 is automatically reset in the locked state under the drive of the first elastic member 1013, ready for the next locking.

Again, if the locking part 1012 is pulled away and then reversed and does not want to unlock the upper and lower lockers, the card block 1036 can be pressed at this time to allow the locking part 1012 to return to the locked position, so that the first connection part 1000 and the second connection part 2000 return to the locked state.

The advantages of the connection structure of the storage box provided in this embodiment include.

1000, the use of the first connection part 1000 and the second connection part 2000 with locking. When the upper locker placed in place at the same time automatically achieve the function of two boxes locked to each other, the user does not need to put the box 1102 after the need to lock the box 1102 and then deliberately to operate both sides of the locking part 1012, just pull open both sides of the locking part 1012 when opened.

2000, the use of rotatable card block 1036 to make the first connection part 1000 and the second connection part 2000 in the unlocked state, the movement of the card block 1036 deterministic, smooth use, greatly improving the convenience of the user.

Fourth Embodiment

Figure 25:
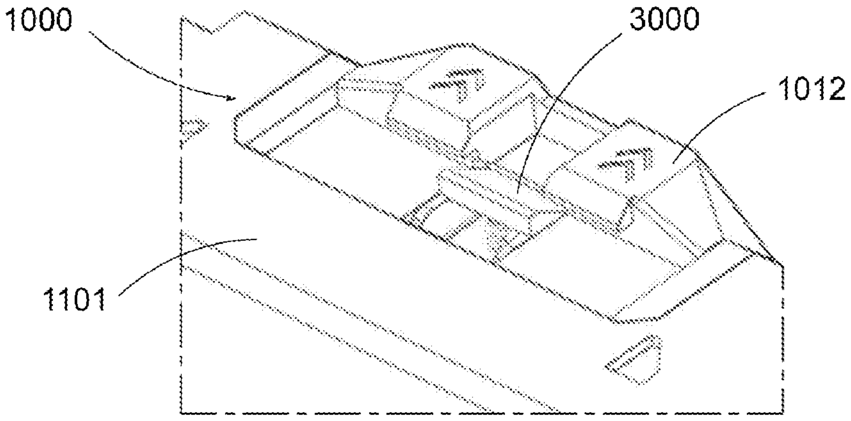
FIG. 25 is a schematic diagram of the local structure of the storage box in the second embodiment of the utility model.
Figure 26:
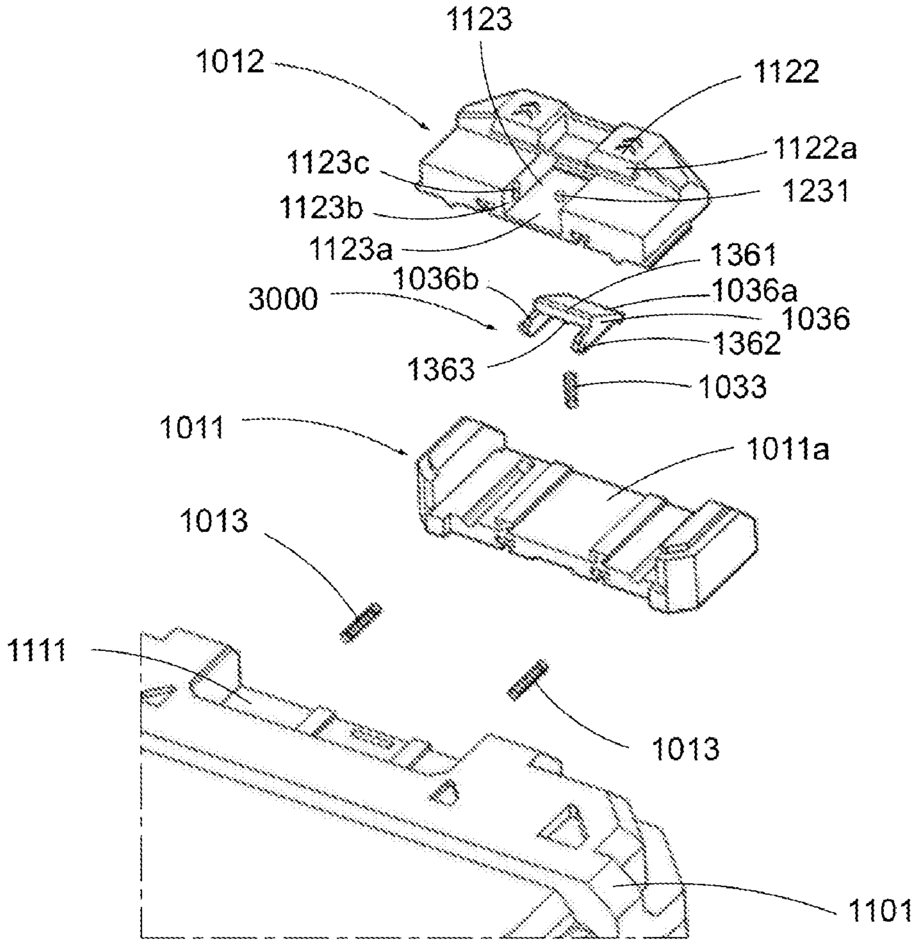
FIG. 26 is a schematic diagram of the local explosion structure of the storage box in the second embodiment of the utility model.

As shown in FIGS. 25 to 26, this embodiment differs from the first embodiment in that the rotation shaft 1037 is directly on the card block 1036, which is integrally formed with the card block 1036, and the second resilient member 1033 is a telescopic spring.

Specifically, the card block 1036 has a first end 1036*a* and a second end 1036*b*, and the second end 1036*b* is closer to the center of the storage box than the first end 1036*a*. The second end 1036*b* of the card block 1036 is provided with protruding shafts 1362 on both sides, and the two protruding shafts 1362 are inserted in the slide rails 1123*c* of the two side walls 1123*b*, so that the protruding shafts 1362 move back and forth in the slide rails 1123*c* to provide guidance for the card block 1036. Further, the card block 1036 is provided with a first projection 1363 and a second projection 1231 on the bottom wall 1123*a*, and the two ends of the second resilient member 1033 are provided on the first projection 1363 and the second projection 1231, respectively.

Other structures, working principles and beneficial effects of the first embodiment of this embodiment can achieve the same, here will not repeat.

The above mentioned is only the specific implementation of the utility model, but the scope of protection of the utility model is not limited to this, any technical person familiar with the art can easily think of changes or replacements within the technical scope disclosed by the utility model, which should be covered by the scope of protection of the utility model. Therefore, the scope of protection of the utility model shall be subject to the scope of protection of the said claims.

The invention claimed is:

1. A storage box comprising:

a first connection part disposed on one area of said storage box connectable to a second connection part of another storage box;

wherein, said first connection part comprises a mounting body, a locking buckle movable with respect to said mounting body, and a first resilient member located between said mounting body and said locking buckle, wherein said first resilient member keeping said locking buckle automatically in a locked state;

wherein, said second connection part of the other storage box comprises a mating part interlockable with the locking buckle, wherein the locking buckle is configured to slide inward with respect to the mounting part so that the locking buckle is automatically lockable with the mating part of the other storage box by action of said first resilient member when the locking buckle is aligned with the mating part of the other storage box;

a locking part cooperating with the locking buckle, wherein manual movement of the locking part causes the locking buckle to move to an unlocked state; and a stop part, wherein when the stop part projects outward with respect to a locking path of the locking part, said locking part is not automatically lockable and said first connection part is in a state of remaining unlocked from said second connection part, wherein the stop part is retractable, said stop part being extended when said first connection part is in a holding unlocked state with said second connection part of the other storage box, and said stop part being compressed when said first connection part is in a locked state with said second connection part.

2. The storage box of claim 1, wherein said stop part is provided on said locking part and is movable with said locking part along the locking path of the locking part.

3. The storage box of claim 2, wherein said locking part comprises a holding slot opened on the locking part, and further comprising a second resilient member combined between the holding slot and the stop part to extend the stop part outward in an extended state and said stop part is accommodated in said holding slot in a compressed state.

4. The storage box of claim 3, wherein when the stop part is retractably provided in said holding slot, said second resilient member is compressed;

when said stop part is biased outward and held against a mating portion, said locking buckle is not automatically lockable to the mating part of the other storage box.

5. The storage box of claim 4, wherein said second resilient member is a torsion spring with one end against said stop part and the other end against a bottom of said holding slot; when said torsion spring is extended, said stop part extends out of said holding slot and when said torsion spring is compressed, said stop part is retracted into said holding slot.

6. The storage box of claim 5, and further comprising a shaft connected to said locking part about which said stop part rotates, said shaft being fixed to said locking part; wherein the torsion spring being positioned on said shaft.

7. The storage box of claim 1, wherein said locking part is a sliding latch for horizontal movement.

8. The storage box of claim 1, wherein said first connection part is provided on a lid of said storage box.

9. The storage box of claim 1, wherein two adjacent storage boxes are interlockable with each other by means of the first connection part and the second connection part of the other storage box.

10. The storage box of claim 1, and further comprising a second resilient member, and wherein the locking part comprises of a slot, and wherein the stop part is biased outward from the slot by the second resilient member.

11. A storage box comprising:

a first connection part disposed on one area of said storage box connectable to a second connection part of another storage box;

wherein, said first connection part comprises a mounting body, a locking buckle movable with respect to said mounting body, and a first resilient member located between said mounting body and said locking buckle, wherein said first resilient member keeping said locking buckle automatically in a locked state;

wherein, said second connection part of the other storage box comprises a mating part interlockable with the locking buckle, wherein the locking buckle is configured to slide inward with respect to the mounting part so that the locking buckle is automatically lockable with the mating part of the other storage box by action of said first resilient member when the locking buckle is aligned with the mating part of the other storage box;

a locking part cooperating with the locking buckle, wherein manual movement of the locking part causes the locking buckle to move to an unlocked state; and a stop part, wherein when the stop part projects outward with respect to a locking path of the locking part, said locking part is not automatically lockable and said first connection part is in a state of remaining unlocked from said second connection part;

a second resilient member, and wherein the locking part comprises of a slot, and wherein the stop part is biased outward from the slot by the second resilient member, wherein the stop part moves perpendicular with respect to a sliding path of the locking part.

12. The storage box of claim 11, wherein the stop part moves outward relative to the locking part.

13. The storage box of claim 11, wherein the second resilient member is a torsion spring and the stop part rotates relative to the locking part.

14. The storage box of claim 1, further comprising a bottom comprising a projection, four sidewalls projecting from the bottom, a hinged lid to access an interior, and a positioning slot on the hinged lid, wherein two adjacent said storage boxes are located with respect to each other by the projection of the bottom and the positioning slot on the lid, wherein the lid comprises four projections and the bottom comprises four positioning recesses, wherein two adjacent said storage boxes are located with respect to each other by the projection and the four positioning recesses on the bottom and the positioning slot and the four projections on the lid; wherein the four projections on the lid project upward from a top face of the lid, and the four positioning recesses of the bottom are located in a bottom face.

15. A storage box comprising:

a first connection part disposed on one area of said storage box, wherein the first connection part comprises a mounting body, a locking buckle movable with respect to the mounting body, and a first resilient member located between the mounting body and the locking buckle to bias the locking buckle automatically outward in a locked state;

a locking part configured to move along a horizontal locking path and to cooperate with the locking buckle, wherein manual movement of the locking part along the horizontal locking path causes the locking buckle to move between an unlocked state retracted with respect to the mounting body and a locked state extended with respect to the mounting body;

a stop part combined to the locking part comprising an unlocked state corresponding to the unlocked state of the locking buckle with the stop part extended from the locking part and the locking buckle held retracted with respect to the mounting body, and a locked state corresponding to the locked state of the locking buckle with the stop part retracted with respect to the locking part and the locking buckle held extended with respect to the mounting body; and a second connection part disposed on another area of said storage box, wherein the second connection part comprises a mating part that corresponds to the locking buckle, wherein said locking part further comprises a holding slot opened on the locking part, and further comprising a second resilient member combined between the holding slot and the stop part, wherein the stop part is extended from the slot in the locking part when the stop part is in the unlocked state, and wherein the stop part is retracted in the slot in the locking part when the stop part is in the locked state.

16. The storage box of claim 15, further comprising a bottom comprising a projection, four sidewalls projecting from the bottom, a hinged lid to access an interior, and a positioning slot on the hinged lid, wherein two adjacent said storage boxes are located with respect to each other by the projection of the bottom and the positioning slot on the lid, wherein the lid comprises four projections and the bottom comprises four positioning recesses, wherein two adjacent said storage boxes are located with respect to each other by the projection and the four positioning recesses on the bottom and the positioning slot and the four projections on the lid; wherein the four projections on the lid project upward from a top face of the lid, and the four positioning recesses of the bottom are located in a bottom face.

* * * * *